UNITED STATES PATENT OFFICE.

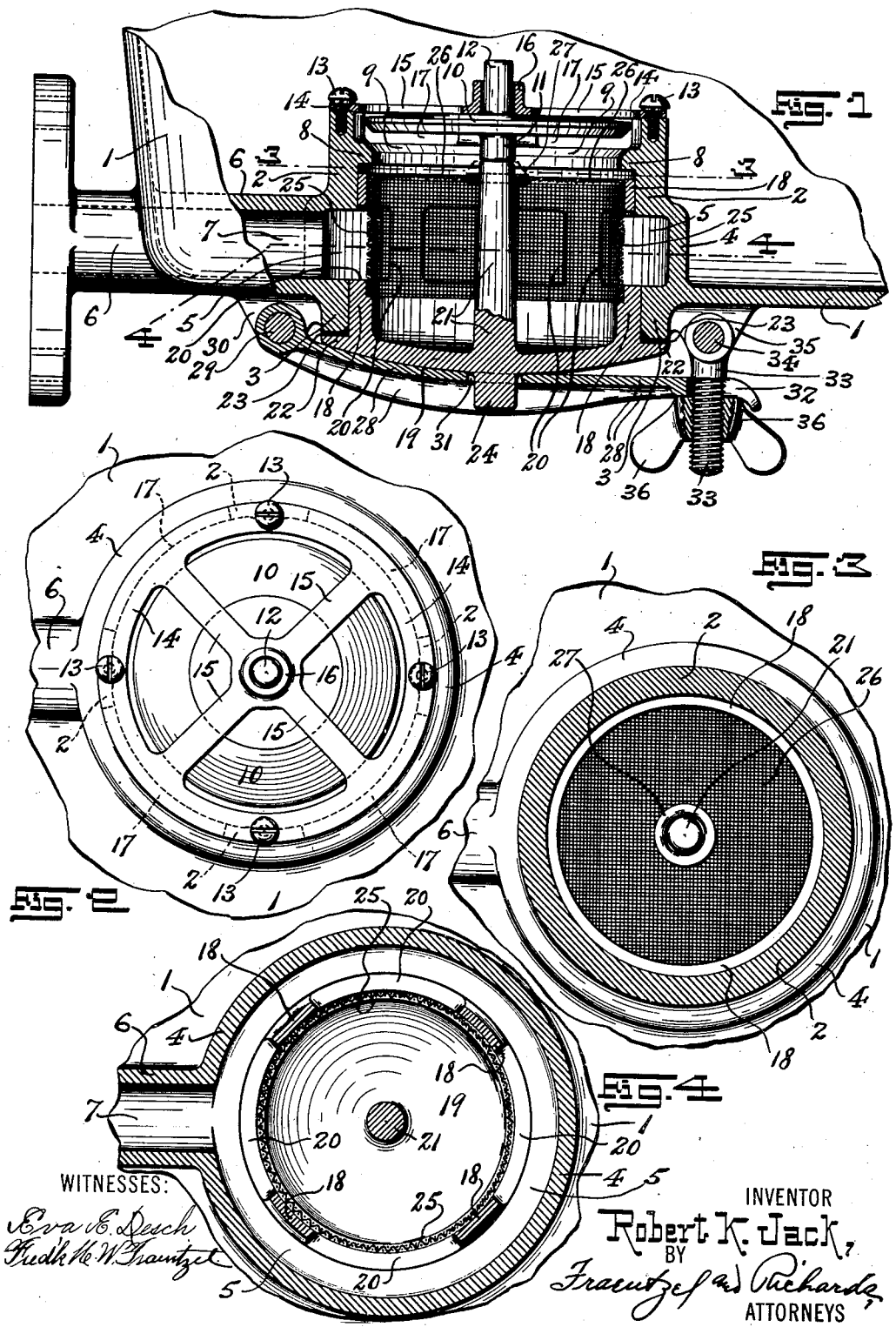

ROBERT K. JACK, OF NUTLEY, NEW JERSEY.

STRAINER DEVICE.

1,220,231.  Specification of Letters Patent.  Patented Mar. 27, 1917.

Application filed August 8, 1916. Serial No. 113,689.

*To all whom it may concern:*

Be it known that I, ROBERT K. JACK, a subject of the King of Great Britain, residing at Nutley, in the county of Essex and State of New Jersey, have invented certain new and useful Improvements in Strainer Devices; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

The present invention relates, generally, to improvements in strainer devices, and the invention has reference, more particularly, to an improved construction of oil-strainer and automatic closing valve therefor.

The present invention has for its principal object to provide an oil-strainer for use in connection with the crank-casings of internal combustion engines, and for such other uses as may be served thereby.

The said invention has for a further object to provide a novel strainer device which is readily accessible for cleansing purposes, and which provides a novel construction and arrangement of self closing valve which automatically shuts off access to the strainer chamber of the oil or other substance, normally passing therethrough, when the chamber is opened to remove the strainer element for the cleansing of the same and for cleansing the interior of the said strainer chamber.

The said invention has for a still further object the provision of a novel and highly efficient construction of strainer element and inclosing strainer chamber for supporting the same.

Other objects of the present invention, not at this time more particularly enumerated, will be clearly understood from the following detailed description of the same.

With the various objects of my present invention in view the same consists, primarily, in the novel construction of strainer device hereinafter set forth, and the invention consists, furthermore, in the novel arrangements and combinations of the various devices and parts, as well as in the details of the construction of the said parts, all of which will be more fully described in the following specification, and then finally embodied in the claims which are appended to and which form an essential part of the said specification.

The invention is clearly illustrated in the accompanying drawings, in which:—

Figure 1 is a vertical longitudinal section of the novel strainer device, made according to and embodying the principles of my present invention.

Fig. 2 is a top or plan view of the same; Fig. 3 is a horizontal section of the same taken on line 3—3, looking downward; and Fig. 4 is another horizontal section of the same, taken on line 4—4, looking downward.

Similar characters of reference are employed in all of the hereinabove described views, to indicate corresponding parts.

Referring now to the said drawings the reference character 1 indicates a portion of the lower part or bottom of the crank-casing of an internal combustion engine, with which I have illustrated my novel construction of strainer device, as positioned to receive and strain the lubricating oil collecting in such crank-casing, before returning the same to the lubricating circulation system of such internal combustion engine.

While I have illustrated my novel construction of strainer device, as the same is adapted for use with internal combustion engines, it must be understood that I do not limit my strainer device to such use, since it will be clearly apparent that it may be applied to other machines or devices, and to many other uses, wherein a straining or filtering operation is desired.

As shown in said drawing my novel strainer device is cast integrally with the said crank-casing, but it will be understood that the same may form a separate and complete device in itself, which may be associated with or secured to said crank-casing 1, or to other mechanisms, in any way desired, or which would commend itself to the mechanical conditions involved.

The said novel strainer device comprises a cylindrical chamber or hollow main body 2, connected with the bottom of said crank-casing 1 so as to extend therethrough to provide an outwardly and downwardly projecting open end-portion 3 beneath said crank-casing 1. Said cylindrical chamber or hollow main body 2 is provided, adjacent to the lower interior level of said crank-casing 1 with annularly enlarged portion 4 providing an interior annular chamber 5 in communication with the interior of said cylindrical chamber or hollow main body 2. Connected with said annularly enlarged portion 4, so as to extend outwardly therefrom and through the crank-casing 1 so as to project exteriorly therefrom, is a pipe-member 6 providing a discharge conduit 7 in communication with said annular chamber 5.

The upper end of said cylindrical chamber or hollow main body 2 is also open, and is provided, just within its open end with an interiorly disposed annular rib 8, upon the upper marginal edge of which is formed a chamfered ground valve-seat 9.

The reference character 10 indicates a valve-disk adapted, under proper conditions, to seat itself upon said valve-seat 9 and thus close the upper open end of said cylindrical chamber or hollow main body 2. Connected with the under-side of said valve-disk 10 is a centrally disposed downwardly projecting stud 11, and connected with the upper side of said valve-disk 10 is a centrally disposed upwardly extending valve-stem 12.

Secured to the upper end of said cylindrical chamber or hollow main body 2, by means of screws 13, or any other suitable fastening means, is a spider-member 14, the radiating-arms 15 of which support a centrally located bearing portion 16, in which said valve-stem 12 is slidably disposed to guide the vertical movements of said valve-disk 10. The marginal edge of said upper open end of said cylindrical chamber or hollow main body 2 is cut away at intervals above said valve-seat 9, to provide lateral passages 17, through which oil, or other substance to be strained may pass beneath said valve-disk 10, when the latter is raised, and thence into the interior of said cylindrical chamber or hollow main body 2.

The reference character 18 indicates a hollow cylindrical strainer-cup, which is closed at its bottom end by a bottom-wall 19, but which is open at its upper end to the passage thereinto of oil, or other substance to be strained. The sides of said strainer-cup 18 are provided with suitably disposed outlet openings 20 which are adapted to communicate with said annular chamber 5 when said strainer-cup is secured in operative position within said hollow main body 2. Connected with said bottom-wall 19, so as to extend centrally and upwardly through the interior of said strainer-cup 18, is a lift-finger 21, which normally abuts against the end of said stud 11 of said valve-disk 10. Said strainer-cup 18 is adapted to be inserted within the lower open end of said cylindrical chamber or hollow main body 2 so as to telescope upwardly thereinto, and the lower closed end of said strainer-cup is provided with a peripheral flange 22, upon which is seated a suitable packing-ring 23. When said strainer-cup is inserted within said cylindrical chamber or hollow main body 2, said flange 22 engages the lower end of the latter, forcing its packing-ring 23 into intimate contact therewith so that the joint is rendered leak proof. Connected with the under side of the bottom-wall 19 of said strainer-cup 18, in a central location, is a downwardly extending lug or pin 24. Said strainer-cup is provided with a strainer-element 25 of inverted cup-shape which is inserted within the interior of said strainer-cup so that its side walls hug closely the side walls of the latter, and thus extend over said outlet openings 20. The top portion or wall 26 of said strainer-element 25 extends over, so as to close with its body, the upper open end of said strainer-cup. Said top portion or wall 26 of said strainer-element 25 is provided with a centrally disposed opening through which extends or projects the upper end of said lift-finger 21, said opening being preferably provided with a marginal binding ring 27 of any suitable material.

The means for retaining said strainer-cup 18, in its normal operative position within said cylindrical chamber or hollow main body 2, comprises a pivoted lock-bar 28, which is pivoted at one end upon a pintle 29 supported by suitable pintle-lugs 30 connected with said crank casing 1. Said lock-bar 28 is provided with a suitably located hole or opening 31, which embraces said lug or pin 24 of said strainer-cup 18, when said lock-bar is swung up against the bottom of the latter into normal holding position relative thereto. The free end of said lock-bar is bifurcated to provide a slot 32 which is adapted to embrace a pivoted screw-threaded lock-bolt 33. Said lock-bolt 33 is pivoted upon a pintle 34 supported by suitable pintle-lugs 35 connected with said crank-casing 1. Screwing upon said pivoted lock-bolt is a winged-nut 36 which, when the lock-bar has been properly associated with said lock-bolt, is screwed up on the latter into engagement with the former to hold the same in its retaining or locking relation to said strainer-cup 18.

When the said strainer-cup 18 is placed within said cylindrical chamber or hollow main body 2, and pushed up therein into its normal operative position, its lift-finger 21 engages the stud 11 of said valve-disk 10 and lifts the latter up and away from its valve-seat 9, thus permitting the oil collected in said crank-casing 1 to flow into the hollow main body 2 through its upper opening and the lateral passages 17. Having thus entered said hollow main body 2 the oil descends upon the top portion or wall 26 of the strainer element 25 and passes therethrough into the interior of the strainer-cup 18, being strained or filtered during such passage. From the interior of said strainer-cup 18 the oil flows outwardly, through the side walls of said strainer-element 25, and thence through the outlet openings 20 of said strainer-cup 18 into said annular chamber 5, thereby undergoing a second or further straining operation. The oil flows from said annular chamber 5 into said conduit 7, and from such point may be pumped back into the circulating lubricating system of an internal combustion engine, of which said crank-casing forms a part. It will thus be apparent that the oil is thoroughly filtered or strained, when passed through my novel strainer device, and foreign particles or grains of dirt and similar undesirable contents, readily and efficiently removed therefrom.

If the strainer element 25 becomes choked up and is in need of cleansing, or if it is desirable to remove the same from said hollow main body 2 for any other purpose, the lock-bar 28 is unfastened and swung downwardly away from the bottom of said strainer-cup 18, so that the latter can be withdrawn and the strainer-element 25 removed therefrom, so that both said parts may be cleansed, or a new strainer element substituted for the old. As the strainer-cup 18 is removed from the hollow main body 2, the support of its lift-finger 21 is removed from the stud 11 of said valve disk 10, consequently the latter drops upon its valve-seat 9, and thus closes the interior of said hollow main body 2 to the further access of the oil remaining in the crank-casing 1, so that there is no loss of oil, nor is it necessary to drain the crank-casing 1 thereof, when it is desired to cleanse or otherwise attend to the strainer device. It will thus be apparent that my invention provides a very simple and efficient strainer device, which possesses the further advantage of a coöperating intake valve which operates automatically to shut off access of oil to the chamber containing the strainer devices when it is desired to cleanse or renew the latter.

I am aware that some changes may be made in the several arrangements and combinations of the various devices and parts of my present invention, as well as in the details of the construction of the same, without departing from the scope of the said invention as set forth in the foregoing specification, and as defined in the claims appended thereto. Hence, I do not limit my present invention to the exact arrangements and combinations of the various parts as described in the foregoing specification, nor do I confine myself to the exact details of the construction of the said parts as illustrated in the accompanying drawings.

I claim:—

1. In a device of the kind described, a hollow body open at its opposite ends, a strainer-cup adapted to be inserted within the lower end of said hollow body, a strainer-element supported by said strainer-cup, a closing valve connected with the upper end of said hollow-body, means connected with said strainer-cup for opening said valve when the former is in operative position, a conduit means leading from the interior of said hollow body access to which is obtained through said strainer-elements, and means for securing said strainer-cup in operative relation to said hollow body.

2. In a device of the kind described, a hollow body open at its opposite ends, a strainer-cup adapted to be inserted within the lower end of said hollow body, a strainer-element supported by said strainer-cup, a closing valve connected with the upper end of said hollow-body, means connected with said strainer-cup for opening said valve when the former is in operative position, a conduit means leading from the interior of said hollow body access to which is obtained through said strainer-elements, means for securing said strainer-cup in operative relation to said hollow body, comprising a pivoted lock-bar adapted to be swung across the under side of said strainer-cup, a pivoted lock-bolt, the free end of said lock-bar being bifurcated to straddle said lock-bolt, and a lock-nut coöperating with said lock-bar and said lock-bolt.

3. In a device of the kind described, a hollow body open at its opposite ends, a strainer-cup adapted to be inserted within the lower end of said hollow body, a strainer-element supported by said strainer-cup, a valve-seat located in the upper open end of said hollow body, a vertically movable valve-disk having a valve-stem, means engaging said valve-stem for guiding vertical movements of said valve-disk, a lift-finger connected with said strainer-cup adapted to engage said valve-disk to raise the same when said strainer-cup is in operative position, a conduit means leading from the interior of said hollow body access to which is obtained through said strainer-element, and means for securing said strainer-cup in operative relation to said hollow-body.

4. In a device of the kind described, a hollow body open at its opposite ends, a strainer-cup adapted to be inserted within the lower end of said hollow body, a strainer-element supported by said strainer-cup, a valve-seat located in the upper open end of said hollow body, a vertically movable valve-disk having a valve-stem, means engaging said valve-stem for guiding vertical movements of said valve-disk, a lift-finger connected with said strainer-cup adapted to engage said valve-disk to raise the same when said strainer-cup is in operative position, a conduit means leading from the interior of said hollow body access to which is obtained through said strainer-element, and means for securing said strainer-cup in operative relation to said hollow-body, comprising a pivoted lock-bar adapted to be swung across the under side of said strainer-cup, a pivoted lock-bolt, the free end of said lock-bar being bifurcated to straddle said lock-bolt, and a lock-nut coöperating with said lock-bolt.

5. In a device of the kind described, a hollow body open at its opposite ends, an annular portion providing an annular chamber intermediate of the ends of said hollow body, a conduit means leading out of said annular-chamber, a strainer-cup closed at its lower end, said strainer-cup being adapted to telescope into the lower end of said hollow-body, the side walls of said strainer-cup having outlet openings adapted to communicate with said annular chambers, a strainer-element contained in said strainer-cup adapted to extend over said outlet openings thereof, a closing valve connected with the upper end of said hollow body, means connected with said strainer-cup for opening said valve when said strainer-cup is in normal operative position, and means for securing said strainer-cup in operative relation to said hollow-body.

6. In a device of the kind described, a hollow body open at its opposite ends, an annular portion providing an annular chamber intermediate of the ends of said hollow body, a conduit means leading out of said annular-chamber, a strainer-cup closed at its lower end, said strainer-cup being adapted to telescope into the lower end of said hollow-body, the side walls of said strainer-cup having outlet openings adapted to communicate with said annular chamber, a strainer-element contained in said strainer-cup adapted to extend over said outlet openings thereof, a closing valve connected with the upper end of said hollow body, means connected with said strainer-cup for opening said valve when said strainer-cup is in normal operative position, and means for securing said strainer-cup in operative relation to said hollow-body, comprising a pivoted lock-bar adapted to be swung across the under side of said strainer-cup, a pivoted lock-bolt, the free end of said lock-bar being bifurcated to straddle said lock-bolt, and a lock-nut coöperating with said lock-bar and said lock-bolt.

7. In a device of the kind described, a hollow body open at its opposite ends, an annular portion providing an annular chamber intermediate of the ends of said hollow body, a conduit means leading out of said annular chamber, a strainer-cup closed at its lower end, said strainer-cup being adapted to telescope into the lower end of said hollow-body, the side walls of said strainer-cup having outlet openings adapted to communicate with said annular chamber, a strainer-element adapted to extend over the upper open end of said strainer-cup and downwardly over said outlet openings of the latter, a valve-seat located in the upper open end of said hollow-body, a vertically movable valve-disk having a valve stem, means connected with said hollow body adapted to engage said valve-stem for guiding the vertical movements of said valve-disk, a centrally disposed lift-finger connected with said strainer-cup and extending upwardly through the same and through said strainer-element into lifting engagement with said valve-disk when said strainer-cup is in normal operative position within said hollow-body, and means for securing said strainer-cup in operative relation to said hollow-body.

8. In a device of the kind described, a hollow body open at its opposite ends, an annular portion providing an annular chamber intermediate of the ends of said hollow body, a conduit means leading out of said annular-chamber, a strainer-cup closed at its lower end, said strainer-cup being adapted to telescope into the lower end of said hollow-body, the side walls of said strainer-cup having outlet openings adapted to communicate with said annular chamber, a strainer-element adapted to extend over the upper open end of said strainer-cup and downwardly over said outlet openings of the latter, a valve-seat located in the upper open end of said hollow-body, a vertically movable valve-disk having a valve stem, means connected with said hollow body adapted to engage said valve-stem for guiding the vertical movements of said valve-disk, a centrally disposed lift-finger connected with said strainer-cup and extending upwardly through the same and through said strainer-element into lifting engagement with said valve-disk when said strainer-cup is in normal operative position within said hollow-body, and means for securing said strainer-cup in operative relation to said hollow-body, comprising a pivoted lock-bar adapted to be swung across the under side of said strainer-cup, a pivoted lock-bolt, the free end of said lock-bar being bifurcated to straddle said lock-bolt, and a lock-nut coöperating with said lock-bar and said lock-bolt.

In testimony that I claim the invention set forth above I have hereunto set my hand this 4th day of August, 1916.

ROBERT K. JACK.

Witnesses:
 Fredk. C. Fraentzel,
 Fred'k H. W. Fraentzel.